United States Patent [19]

Winkler

[11] Patent Number: 4,706,420

[45] Date of Patent: Nov. 17, 1987

[54] RETRACTABLE GREENHOUSE CANOPY

[76] Inventor: Marshall N. Winkler, 146 South St., Rockport, Mass. 01966

[21] Appl. No.: 851,819

[22] Filed: Apr. 14, 1986

[51] Int. Cl.[4] .......................... E04B 7/16; A01G 9/14
[52] U.S. Cl. ......................................... 52/66; 52/90; 47/17
[58] Field of Search .................... 52/22, 63, 64, 66, 67, 52/69, 71, 72, 222, 40, 747, 90; 47/17

[56] References Cited

U.S. PATENT DOCUMENTS 2,193,921  3/1940  Gibbons .................................. 47/17

FOREIGN PATENT DOCUMENTS 197775   4/1907  Fed. Rep. of Germany .......... 47/17
662194   7/1938  Fed. Rep. of Germany .......... 47/17
563865  10/1923  France ..................................... 47/17

Primary Examiner—James L. Ridgill, Jr.
Attorney, Agent, or Firm—Jerry Cohen; William E. Noonan

[57] ABSTRACT

A retractable greenhouse canopy apparatus (10) including a support mechanism (22) pivotably mounted to the ground beside a greenhouse (12) for extending above but not fully across the greenhouse. The support mechanism includes a first portion (23) extending upwardly from the ground and a second portion hingedly attached to the distal end of said first portion. An insulated blanket (14) is supported by the support mechanism and includes a first portion (54) for covering a section of the greenhouse beneath the support mechanism and a second portion (56) for covering a section of the greenhouse beneath the second portion of the support mechanism. The second portion of the support mechanism is folded relative to the first portion of the support mechanism and the support mechanism is pivotably raised to retract the blanket sufficiently to expose a previously covered region of the greenhouse and the second portion of the support mechanism is unfolded relative to the first portion of the support mechanism and the support mechanism is pivotably lowered to extend the blanket and cover the exposed region of the greenhouse.

19 Claims, 7 Drawing Figures

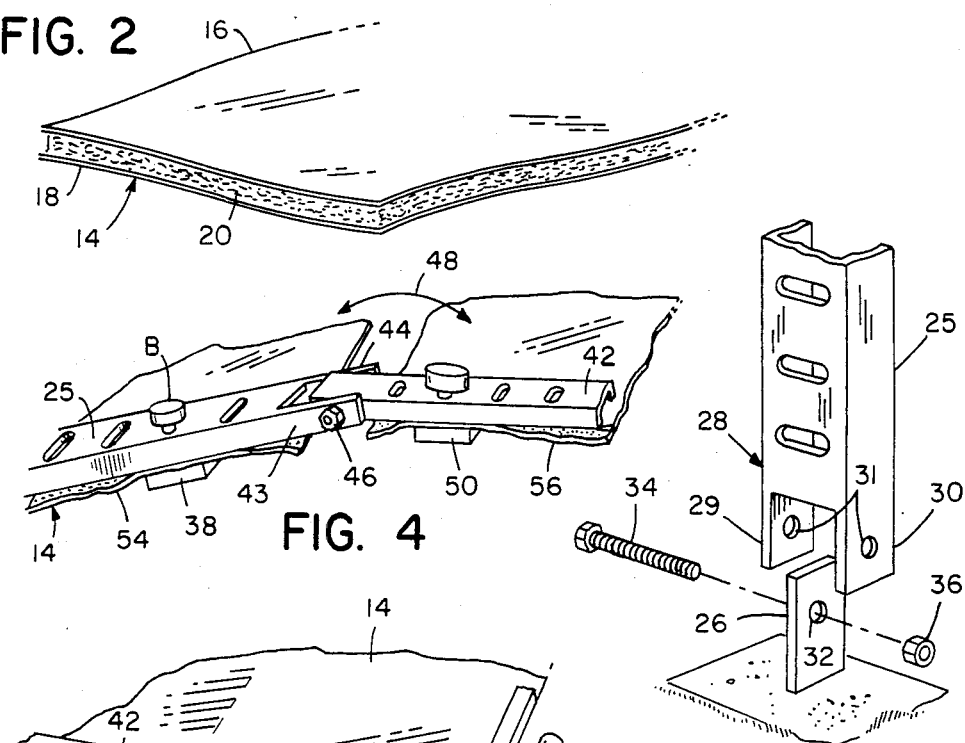
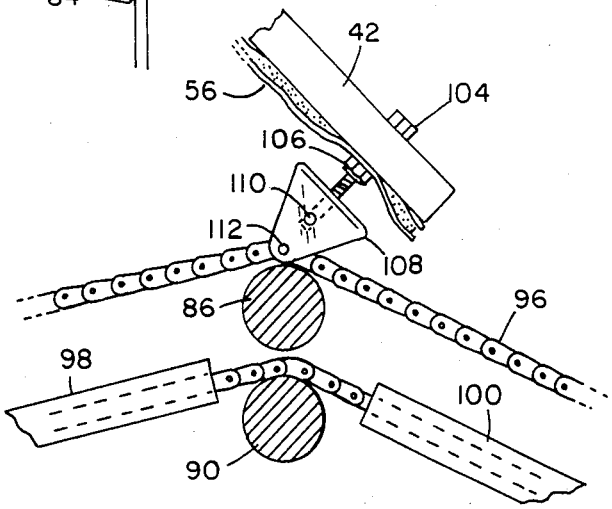

RETRACTABLE GREENHOUSE CANOPY

BACKGROUND OF THE INVENTION

This invention relates to a retractable insulated canopy for greenhouses.

Up to 90% of the heat loss from conventional greenhouses occurs at night and during other dark or overcast periods. Accordingly, some greenhouses presently employ a variety of conventional insulating mats, shades, curtains and heat blankets for covering the transparent panes of the greenhouse and thereby slowing the escape of heat during periods of darkness. See, for example, U.S. Pat. No. 4,318,251. Such devices are also used to regulate the amount of sunlight entering the greenhouse and thereby the flowering cycles of certain plants.

The effectiveness of such insulating shades has been limited. At insulation levels above approximately R-4 these devices are too thick, bulky and cumbersome to withdraw and deploy each day. Interior supports and obstructions in greenhouses leave spaces in blankets that are difficult to seal against air infiltration and heat loss. Hand operated roll-down shades or blankets have been used on the outside of small greenhouses but like interior blankets their R-value is low because thick insulation is difficult to operate on a day to day basis.

There has been no practical system to employ power operated blankets that roll up and down for commercial greenhouses especially in stormy weather when insulated is most needed. Double layers of fixed plastic, inflated with air are used, with insulation values of R-3 but these systems cut the sunlight admitted into greenhouses by over 50%, and as a result cut plant growth in half in the winter months.

Moreover, existing greenhouse shades and curtains also permit a significant portion of the solar radiation passing in the vicinity of the greenhouse to totally miss the house. Such radiation and its energy is, therefore, not utilized.

High energy costs and inefficient heating have severely hampered most of the large commercial greenhouses in the frost belt of the United States. The average consumption of oil for such greenhouses is typically two gallons per square foot per year. As a result the market in plants and cut flowers has been largely assumed by foreign growers. By employing an enhanced system of heavy insulation during the night, greenhouse oil consumption could be cut by 80-90% thereby making U.S. growers more competitive.

To address these problems I have previously provided an insulated greenhouse canopy apparatus which employs a rigid self supporting enclosure, U.S. Ser. No. 717,900, filed Mar. 29, 1985. Although that structure provides improved results it is rather heavy because it employs a rigid self supporting construction. As a result, raising and lowering the canopy can be difficult at times. The system also requires a rather complex system of winches and cables for raising and lowering the canopy.

SUMMARY OF THE INVENTION

It is therefore an object of this invention to provide a retractable greenhouse canopy apparatus which permits enhanced amounts of insulation to be conveniently and rapidly deployed over and removed from a greenhouse.

It is a further object of this invention to provide a retractable greenhouse canopy apparatus which is rugged but lightweight and easily deployed without requiring counterbalancing.

It is a further object of this invention to provide a retractable greenhouse canopy apparatus which provides for significantly improved greenhouse insulation and which reduces heat-loss from greenhouses at night and during other dark and overcast periods, thereby enhancing energy efficiency and improving the operation of the greenhouse.

It is a further object of the invention to provide a retractable greenhouse canopy apparatus which maintains desirable insulation values and which conveniently and effectively sheds precipitation.

It is a further object of this invention to provide a retractable greenhouse canopy apparatus which enhances collection of solar radiation passing in the vicinity of the greenhouse and transmission of such radiation to the interior of the greenhouse.

It is a further object of this invention to provide a retractable greenhouse canopy apparatus which employs an improved mechanism for effectively raising and lowering the canopy without dragging the canopy across the greenhouse and without damaging the canopy or greenhouse.

It is a further object of this invention to provide a retractable greenhouse canopy apparatus which is readily adaptable to many types and sizes of conventional greenhouses.

This invention features a retractable greenhouse canopy apparatus which includes a support mechanism pivotably mounted to the ground beside a greenhouse for extending above but not fully across the greenhouse. The support mechanism includes a first portion extending upwardly from the ground and a second portion hingedly attached to the distal end of the first portion. There are insulated blanket means supported by the support mechanism and including a first portion for covering a section of the greenhouse beneath the first portion of the support mechanism and a second portion for covering a section of the greenhouse beneath the second portion of the support mechanism. Means are provided for folding the second portion of the support mechanism relative to the first portion of the support mechanism and pivotably raising the support mechanism to retract the blanket means sufficiently to expose a previously covered region of the greenhouse. There are also means for unfolding the second portion of the support mechanism relative to the first portion of the support mechanism and pivotably lowering the support mechanism to extend the blanket means to cover the exposed portion of the greenhouse.

In a preferred embodiment the first portion of the support mechanism includes a first plurality of elongate support elements, each being pivotably attached proximate one end to the ground and the second portion of the support mechanism includes a second plurality of support elements, each being hingedly attached to the respective one of the first plurality of support elements. A ridge element may transversely interconnect the first plurality of support elements and at least one element may transversely interconnect the second plurality of support elements. These support and transverse elements are preferably composed of a lightweight but sturdy material such as aluminum or anodized steel. Angle iron or channel iron elements may be employed. Alternatively, laminated wood or other materials may be used.

The blanket means may include at least one pair of spaced apart flexible sheets with insulation means such as cellulose or fiberglass interposed between them. The spaced apart sheets may be attached to opposite sides of the ridge member or may both be attached above or below the support mechanism. Typically each of the first and second blanket portions includes a pair of spaced apart flexible sheets with insulation disposed between them. The blanket may be provided with insulation having a value of at least R-10. The outside surface of the second portion of the blanket means may be light reflective.

The means for folding and raising and the means for unfolding and lowering may include a reciprocably operable mechanism mounted to the greenhouse, means for connecting the second portion of the support mechanism to the reciprocably operable mechanism and means for operating the reciprocably operable mechanism in a first direction to fold the first portion of the support mechanism relative to the second portion of the support mechanism and pivotably raise the support mechanism and in a second opposite direction to unfold the second portion of the support mechanism relative to the first portion of the support mechanism and pivotably lower the support mechanism. The reciprocably operable mechanism may include endless loop means. For example, an endless chain may be mounted on and driven by a motor driven sprocket. Typically, such an endless chain is associated with each of the elements in the second plurality of support elements and is attached proximate the end of that support element. Bearing means such as idler rollers may be mounted to the greenhouse for driving the endless loop means thereover. Guide means may also be provided for guiding movement of the endless loop therethrough. Although a chain and sprocket are shown in the embodiment disclosed herein, it should be understood that various other reciprocably operable mechanisms such as cables, ropes, alternative endless loop devices, and pistons may be employed to raise and lower the support mechanism.

Stop means may be provided for engaging the support mechanism in its raised condition to limit pivoting of the support mechanism past a predetermined point.

BRIEF DESCRIPTION OF THE DRAWINGS

Other objects, features, and advantages will be apparent from the following detailed description of preferred embodiments taken in conjunction with the accompanying drawings in which:

FIG. 2 is an isometric cutaway view of a piece of the blanket used in the canopy apparatus.

FIG. 3 is an isometric view of the pivotable end of one of the first plurality of support elements.

FIG. 4 is an isometric view of the foldable hinged connection between the first and second support elements.

FIG. 5 is an isometric view rotated from the perspective shown in FIG. 1 of the distal end of one of the second plurality of support elements and its manner of attachment to the reciprocably operable chain drive.

FIG. 5A is an elevational view of the distal end of a second support element and the attached blanket being retracted over the idler roller above the ridge of the greenhouse.

DESCRIPTION OF PREFERRED EMBODIMENTS

Figure 1:
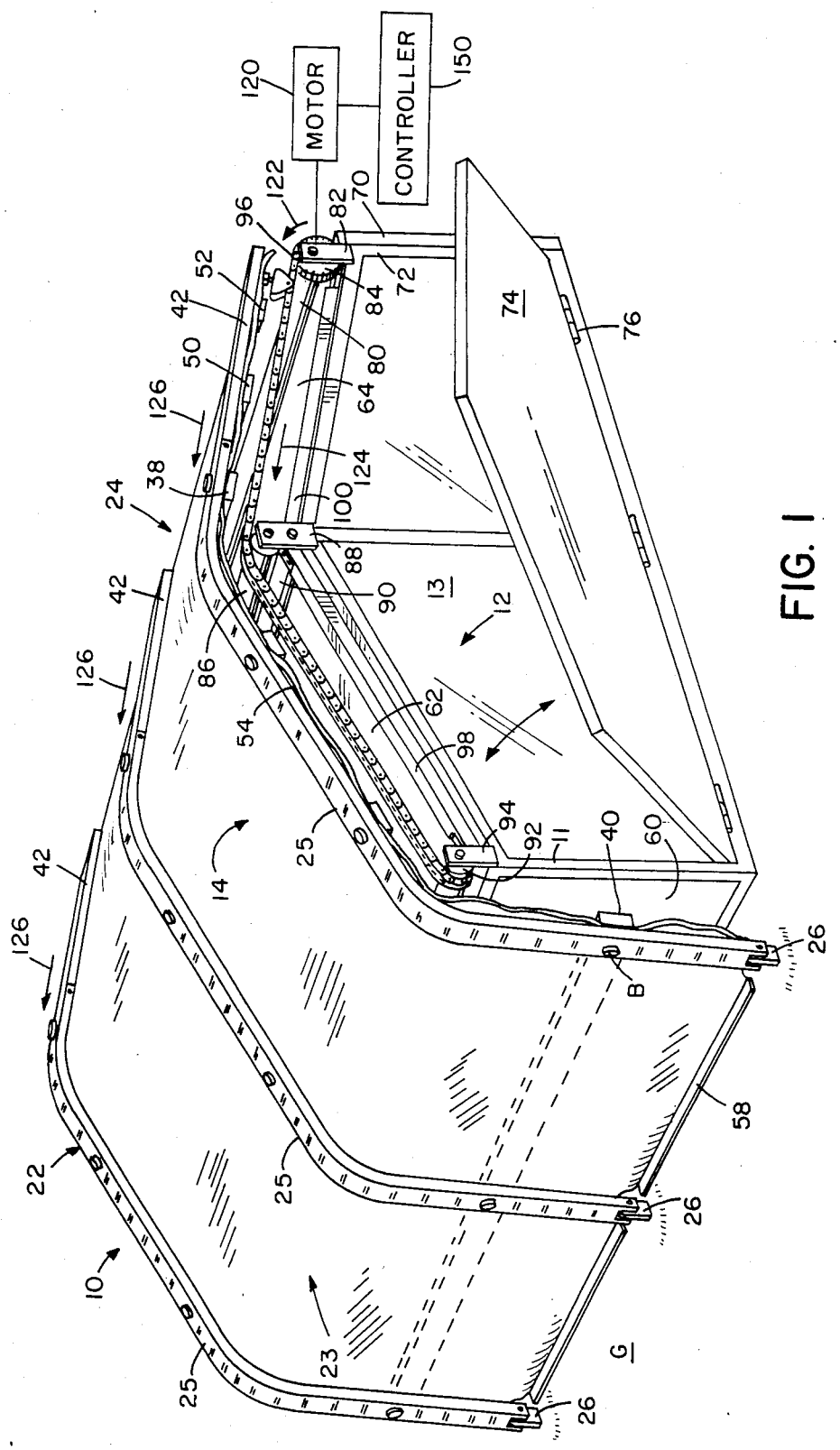
FIG. 1 is an isometric, partly schematic view of a preferred embodiment of the retractable greenhouse canopy apparatus of this invention in a closed condition.

There is shown in FIG. 1 a retractable greenhouse canopy apparatus 10 for selectively covering a conventional greenhouse 12, FIG. 1, with a flexible insulated blanket 14. Greenhouse 12 includes, for example, a metal or wood frame 11 and plastic or glass walls 13. As shown more clearly in FIG. 2, blanket 14 is typically composed of a pair of spaced apart sheets 16 and 18 which are sealed together along their edges and filled with bats of cellulose or fiberglass 20 up to an insulating value of R-40 to R-50. Sheet 16 is typically composed of a sun and water resistant fabric and sheet 18 preferably includes a flexible plastic such as polyethelene.

Blanket 14 is supported by a support mechanism 22 which includes first and second portions 23 and 24. Support portion 23 includes a first plurality of arcuate support elements 25 pivotably mounted at one end by respective posts 26 to the ground G. The support elements are formed of any rigid and strong, but preferably relatively lightweight, material. As illustrated in FIG. 3, the lower end 28 of each element 25 includes extension sections 29, 30, having respective holes 31 which are aligned with a corresponding hole 32 in post 26 to receive a pivot bolt 34. A nut 36 is secured to bolt 34 to pivotably attach the support element 25 to post 26.

The support elements 25, FIG. 1, extend above and slightly beyond the ridge of greenhouse 12 and are themselves joined together by a ridge element 38 and by optional cross braces or purlins 40, each of which is secured to the inner concave edge of each support element 25 in a conventional manner such as by welding or bolts B.

Second support mechanism portion 24 includes a second plurality of support elements 42 which are hingedly attached to respective support elements 25. As shown in FIG. 4, the upper distal end of each element 25 includes a pair of extension sections 43 and 44 between which extends one end of a respective element 42. A pivot 46 is received through section 43, element 42 and section 44 to secure elements 25 and 42 together and permit element 42 to fold relative to element 25, as indicated by double headed arrow 48. Transverse purlins 50, 52, FIG. 1, connect the individual elements 42. These purlins are arranged at appropriately spaced positions along elements 42 so that they do not engage or interface with ridge element 38 or purlins 40 when elements 42 are folded relative to elements 25 (see FIG. 6).

Figure 6:
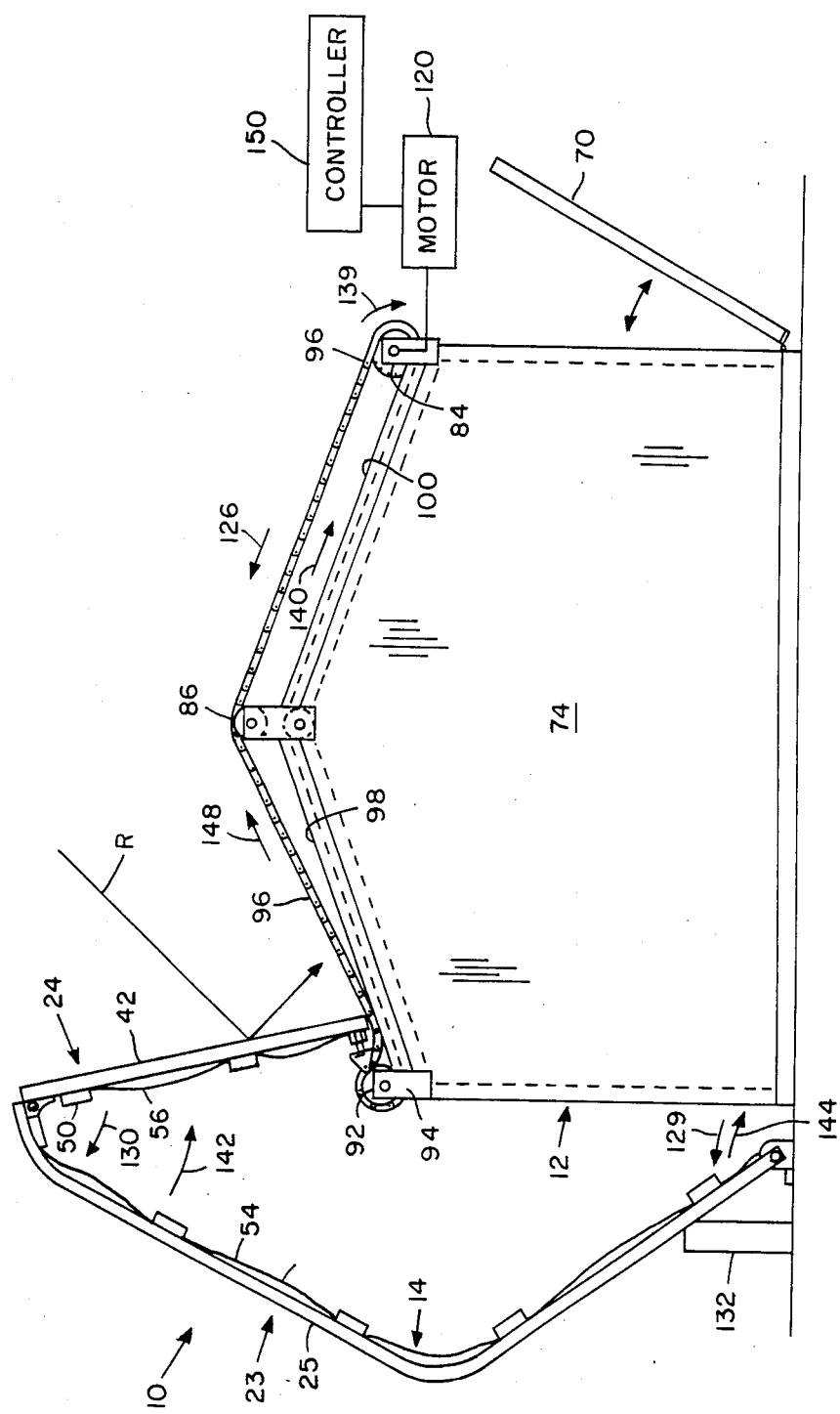
FIG. 6 is a partly schematic side view of the canopy apparatus in its raised condition.

As shown most clearly in FIG. 4, blanket 14 may include a first blanket section 54 carried by support elements 25 and a separate blanket section 56, FIGS. 4 and 6, carried by support elements 42. Alternatively, the blanket sections may be joined in an integral blanket. Blanket section 54 is attached to the support mechanism by interposing the blanket section between support elements 25 and the ridge element 38 and transverse cross braces 40. Blanket section 56 is similarly secured between support elements 42 and purlins 50 and 52. Alternatively, the blanket sections may be attached by bolts or other conventional means to the support elements. And although the blanket is shown attached below support elements, in alternative embodiments the blanket may be attached above the support mechanism.

The lower edge of blanket section 54, FIG. 1, is secured to the ground beneath a batten 58. First blanket section 54 extends generally from batten 58 to the upper end of support elements 25 so that it covers side 60, roof surface 62 and a portion of roof surface 64 of greenhouse 12. Second blanket section 56 extends from the hinged ends of support elements 42 over substantially the remainder of roof surface 64. Insulation piece 70 is mounted to cover side 72 of greenhouse 12 and insulation piece 74 similarly covers the end surfaces of the greenhouse. As shown in FIG. 1, the insulation pieces may be pivotably mounted, such as by hinges 76 so that they may be lowered or raised as needed. Such lowering may be accomplished manually or by a conventional apparatus synchronized to operate with the drive mechanism of this invention, described below.

That drive mechanism includes a drive shaft 80 rotatably mounted along one of the eaves of greenhouse 12 by bearing elements 82 (only one of which is shown) mounted in a conventional manner to the greenhouse frame 11 at spaced positions along the eave. Shaft 80 includes a number of sprocket elements 84, each of which is associated with a respective pair of hingedly attached support elements 25 and 42. An idler roller 86 is similarly mounted above and extended along the ridge of greenhouse 12 by spaced bearing elements 88 (only one shown) which are themselves mounted to the frame of the greenhouse. An idler roller 90 is also rotatably mounted to bearing elements 88 above the ridge and below roller 86. A third idler roller 92 is rotatably mounted by bearing elements 94, attached to the other eave of the frame, to extend along and above that eave. Each of the rollers may be a single continuous roller element or multiple end-to-end roller elements. A reciprocally operable endless chain 96 is associated with each pair of support elements 25 and and 42. As shown in FIGS. 1 and 5 each chain 96 engages a respective sprocket 84. The upper portion of the chain extends from sprocket 84 beneath support mechanism 22 and passes above idler roller 86 and around idler roller 92. The lower portion of chain 96 passes through a typically square guide 98 which is connected in a conventional manner between bearing elements 94 and 88. The chain exits guides 98 and passes over lower idler roller 90. It then enters a second guide 100 attached between bearing elements 88 and 82. Upon exiting guide 100 chain 96 completes its loop by engaging sprocket 84.

Each support element 42 is attached to a respective chain 96, for example, as shown in FIG. 5. A bolt 104 extends through element 42 proximate its distal end and further extends through blanket section 56 beneath the support element. A nut 106 holds the edge of the blanket in place and prevents it from flapping. A triangular element 108 is attached to bolt 104 by a pin 110 and is further attached to chain 96 by a second pin 112 which is simply an extended pin connecting a pair of adjacent links of chain 96.

At night and during extended overcast periods canopy apparatus 10 is deployed as shown in FIG. 1 so that blanket 14 reduces heat loss from greenhouse 12. To remove blanket 14 so that roof portions of greenhouse 12 may be exposed to the sunlight conventional motor 120 is operated to drive shaft 80 and sprockets 84 in the direction of arrow 122. This drive chains 96 in the direction of arrow 124 and, as a result, the chains lift support elements 42 and drive them upwardly in the direction of arrows 126, FIG. 1. As shown most clearly in FIG. 6, this operation pivotably raises support elements 25 in the direction of arrow 129 and folds support elements 42 inwardly relative to elements 25 in the direction of arrow 130. The distal ends of elements 42 are carried by chains 96 over roller 86, FIG. 5A and the chain continues to be driven until the distal ends of elements 42 reach approximately the eave over which idler roller 92 extends. A stop 132 limits the extent to which support elements 25 can be raised and the position of the stop is selected to help prevent the distal ends of elements 42 from being drawn beyond roller 92. Guides 98, 100 provide a dependable passageway for chain 96 and prevent the chain from slipping or jumping the sprocket during its operation.

Interference with and damage to greenhouse 12 is minimized because support mechanism 22 is essentially being pushed from over the greenhouse rather than being dragged along the house. Because chain 96 is attached proximate the distal ends of elements 42 those elements are lifted somewhat from the surface of the greenhouse roof as the chain begins to move and elements 42 push pivotably mounted elements 25 away from the greenhouse.

Because of the folding action between support portions 23 and 24 and the acute angle formed between those portions snow is readily shed by the canopy as it is opened. The outside surface of at least blanket section 56 includes a reflective material so that solar rays R, which would otherwise miss greenhouse 12, are reflected from the outer surface of section 56 and directed toward the greenhouse. As a result, enhanced heating efficiency is accomplished. Heating may also be adjusted by pivotably raising and lowering insulation pieces 70 and 74 (not shown in FIG. 6, but shown in FIG. 1).

To redeploy apparatus 10 and again cover greenhouse 12 with blanket 14, motor 120 is reversed in direction to operate drive shaft 80 in the direction of arrow 139. Chain 96 is thereby driven in the direction of arrow 140. This causes support elements 42 to unfold in the direction of arrow 142 relative to respective support elements 25 and support elements 25 are pivotably lowered in the direction of arrow 144. The distal ends of support elements 42 are drawn by the chain in the direction of arrow 148. Support elements 42 are drawn over ridge roller 86 and support mechanism 22 eventually resumes the condition shown in FIG. 1 with blanket 14 covering roof portions 62 and 64 of greenhouse 12.

The entire sequence of retraction and deployment of apparatus 10 may be regulated by a controller 150, FIGS. 1 and 6. Controller 150 may be programmed to operate the motor in the sequence described above so that, for example, the blanket may be deployed and retracted at predetermined times of the day. By employing conventional light or temperature sensors with controller 150 the apparatus may also be deployed and retracted accurately to sensed sunlight, darkness and temperature conditions.

Because the insulating blanket is flexible and relatively lightweight and because the support mechanism of this invention extends only partly across the greenhouse and is constructed of lightweight materials, the canopy apparatus is conveniently maneuverable. Enhanced amounts of insulation may be quickly and easily deployed over and retracted from the greenhouse as required. Moreover, the relatively light weight permits raising and lowering to be performed without an added counterbalancing mechanism.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. A retractable greenhouse canopy apparatus comprising:
   a first skeletal support section including a first plurality of elongate support elements;
   means for pivotably mounting each of said first plurality of support elements to the ground beside a greenhouse;
   a second skeletal support section including a second plurality of elongate support elements, each foldably attached to a respective element of said first plurality of support elements, said first and second support sections being extendable above and at least partly across the greenhouse, insulated blanket means extending across, attached to and retractably and extendably carried by said first and second support sections for covering an area of the greenhouse beneath said first and second support sections, and
   reciprocably operable means for selectively folding said second plurality of support elements relative to said first plurality of support elements and pivotably raising said first plurality of support elements to retract said blanket means sufficiently to expose a previously covered region of the greenhouse and means for selectively unfolding said second plurality of support elements relative to said first plurality of support elements and pivotably lowering said first plurality of support elements to extend said blanket means sufficiently to cover a previously exposed region of the greenhouse.

2. A retractable greenhouse canopy comprising:
   a first substantially rigid skeletal support section;
   means for pivotably mounting said first support section to the ground beside a greenhouse;
   a second substantially rigid skeletal support section foldably attached to the distal end of said first support section, and insulated blanket means extending across, attached to and carried by said first and second support sections, said first and second support sections being selectively extendable above and at least partially across the greenhouse for covering a previously exposed region of the greenhouse with said insulating blanket means and retractable for exposing a previously covered region of said greenhouse.

3. An apparatus in accordance with claim 2 further including at least one element transversely interconnecting said second plurality of support elements.

4. An apparatus in accordance with claim 2 wherein said blanket means includes at least one pair of spaced apart flexible sheets with insulation interposed between them.

5. Apparatus in accordance with claim 2 wherein each of said first and second blanket portions includes a pair of spaced apart flexible sheets with insulation interposed between them.

6. An apparatus in accordance with claim 2 further including stop means for engaging said first support section in its raised condition to limit pivoting of said support mechanism past a predetermined point.

7. An apparatus in accordance with claim 2 wherein said flexible blanket means includes insulation having a value of at least R-10.

8. An apparatus in accordance with claim 2 wherein the outside of said second portion of said blanket means is light reflective.

9. An apparatus in accordance with claim 2 wherein said first support section includes a first plurality of elongate support elements each pivotably attached to the ground and second support section includes a second plurality of support elements, each foldably attached to a respective element of said first plurality of support elements.

10. An apparatus in accordance with claim 9 wherein said first support section further includes a ridge member transversely interconnecting said first plurality of support elements.

11. Apparatus in accordance with claim 10 wherein said blanket means includes at least one pair of spaced apart flexible sheets, the respective sheets of at least one said pair being attached to opposite sides of said ridge member with insulation interposed between said sheets.

12. A retractable greenhouse canopy comprising:
    a first substantially rigid skeletal support section;
    means for pivotably mounting said first support section to the ground beside a greenhouse;
    a second substantially rigid skeletal support section foldably attached to the distal end of said first support section, said first and second support sections being extendable above and at least partly across the greenhouse;
    insulated blanket means extending across, attached to and retractably and extendably carried by said first and second support sections for covering an area of the greenhouse beneath said first and second support sections; and
    means for selectively folding said second support section relative to said first support section and pivotably raising said first support section to retract said blanket means sufficiently to expose a previously covered region of the greenhouse and means for selectively unfolding said second support section relative to said first support section and pivotably lowering said first support section to extend said blanket means to cover a previously exposed region of the greenhouse.

13. An apparatus in accordance with claim 12 wherein said means for folding and means for unfolding include a reciprocably operable mechanism mounted to the greenhouse, means for connecting the second support section to said reciprocably operable mechanism and means for operating said reciprocably operable mechanism in a first direction to fold said first support section and pivotably raise said first support section and in a second opposite direction to unfold said second support section and pivotably lower said first support section.

14. An apparatus in accordance with claim 13 wherein said reciprocably operable mechanism includes endless loop means.

15. An apparatus in accordance with claim 13 wherein said reciprocably operable mechanism is attached proximate the distal end of said second support section.

16. An apparatus in accordance with claim 14 wherein said second support section includes a plurality of elongate support elements hingedly attached to said first support section and wherein an endless loop element is attached proximate the distal end of each said support element in said second support section.

17. An apparatus in accordance with claim 14 in which said endless loop means includes chain means and said means for operating includes sprocket means mounted to the greenhouse for drivably engaging said chain means.

18. An apparatus in accordance with claim 14 further including bearing means mounted to the greenhouse for driving said endless loop means thereover.

19. An apparatus in accordance with claim 14 further including guide means mounted to the greenhouse for guiding movement of said endless loop therethrough.

* * * * *